April 26, 1927.  1,626,119
J. M. OLIN ET AL
METHOD AND APPARATUS FOR STRIPPING DETONATOR IGNITER TERMINALS
Filed Oct. 12, 1925  3 Sheets-Sheet 2
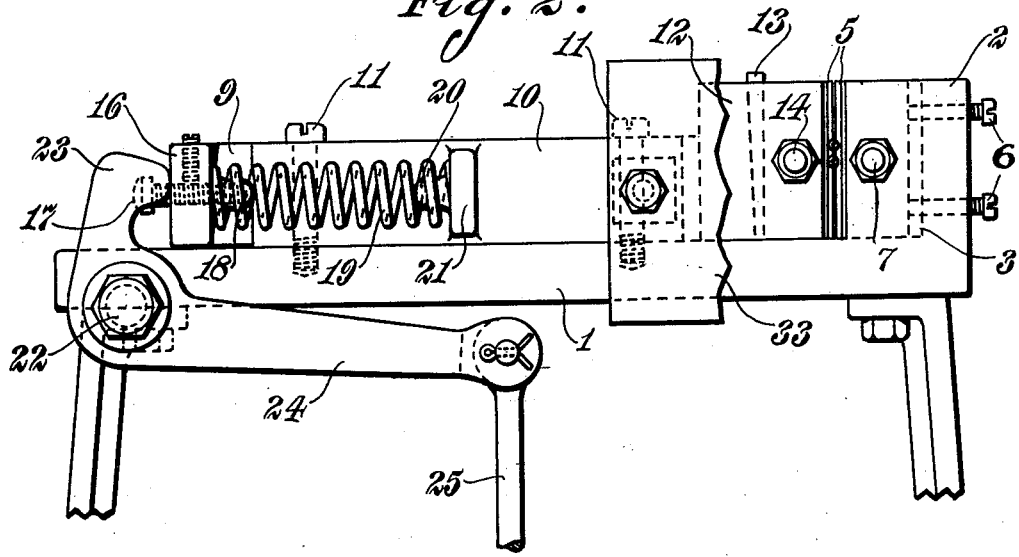
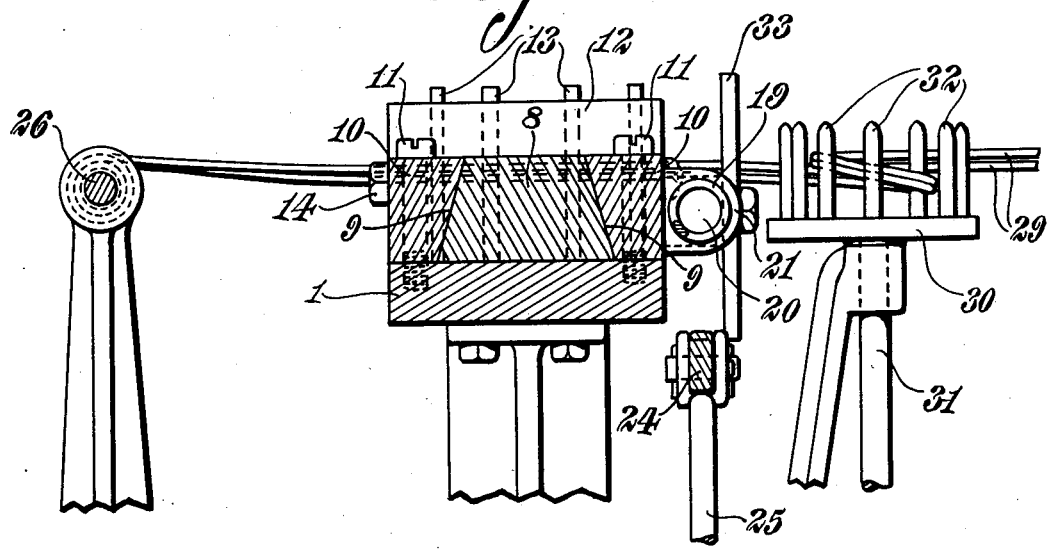
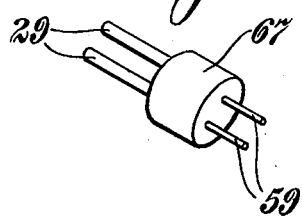
Inventors:
John M. Olin,
John B. Smith,
By John H. Bruninga
Their Attorney.

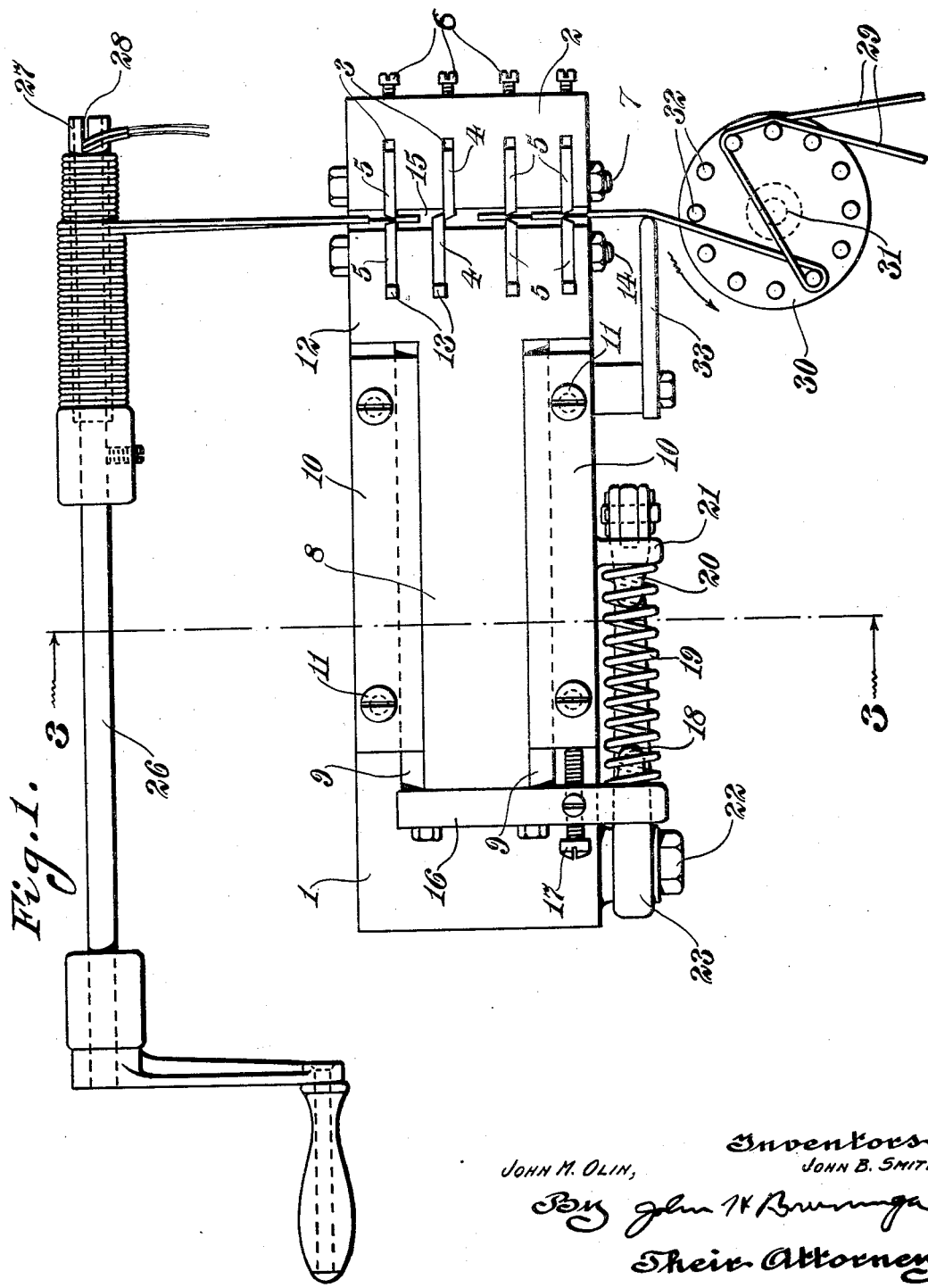

April 26, 1927. 1,626,119
J. M. OLIN ET AL
METHOD AND APPARATUS FOR STRIPPING DETONATOR IGNITER TERMINALS
Filed Oct. 12, 1925 3 Sheets-Sheet 3

Inventors:
John M. Olin,
John B. Smith,
John H. Bruninga,
Their Attorney.

Patented Apr. 26, 1927.

1,626,119

UNITED STATES PATENT OFFICE.

JOHN M. OLIN AND JOHN B. SMITH, OF ALTON, ILLINOIS, ASSIGNORS TO WESTERN CARTRIDGE COMPANY, OF EAST ALTON, ILLINOIS, A CORPORATION OF DELAWARE.

METHOD AND APPARATUS FOR STRIPPING DETONATOR-IGNITER TERMINALS.

Application filed October 12, 1925. Serial No. 62,199½.

This invention pertains to a method and apparatus for severing and stripping the insulation from lead wires or connections such, for instance, as are provided with detonators used for electrically exploding blasting charges. This application is a continuation in part of application Serial No. 609,954, filed Dec. 30, 1922.

In the manufacture of certain articles such as detonators the same are supplied to the trade with connections attached thereto. These connections comprise a certain length of insulated electric wire, usually a double strand thereof. In the manufacture of such articles these lead wires or connections must be stripped of their insulation for a certain distance at one or both ends so that they may be ready to be electrically connected to the detonator and to the source of electrical energy used for firing the same. When the manufacture of such articles is carried out on a large scale it is desirable to have a method and apparatus which will carry out the severing and stripping operations as rapidly and conveniently as possible.

One of the objects of this invention, therefore, is to provide a method and apparatus for severing and stripping the ends of the connection wires in a rapid and effective manner.

Another object is to provide such a method and apparatus in which the severing and stripping operations may be accomplished simultaneously.

As one end of each connection wire is connected to the detonator while the other may be connected to any one of the variety of different types of firing devices it is desirable to strip the insulation from the detonator end a comparatively short distance while the other end is stripped for a considerably greater distance.

Another object of this invention, therefore, is to provide a method and apparatus which will automatically strip the different ends for different distances.

Further objects will appear from the following description taken in connection with the accompanying drawings in which:

Figure 1 is a plan view of an apparatus embodying this invention and adapted for carrying out the method thereof;

Figure 2 is a side elevation of the apparatus shown in Figure 1;

Figure 3 is a section on line 3—3 of Figure 1;

Figure 4 is a perspective view of the stripped wires with a plug cast thereon;

Figure 5:
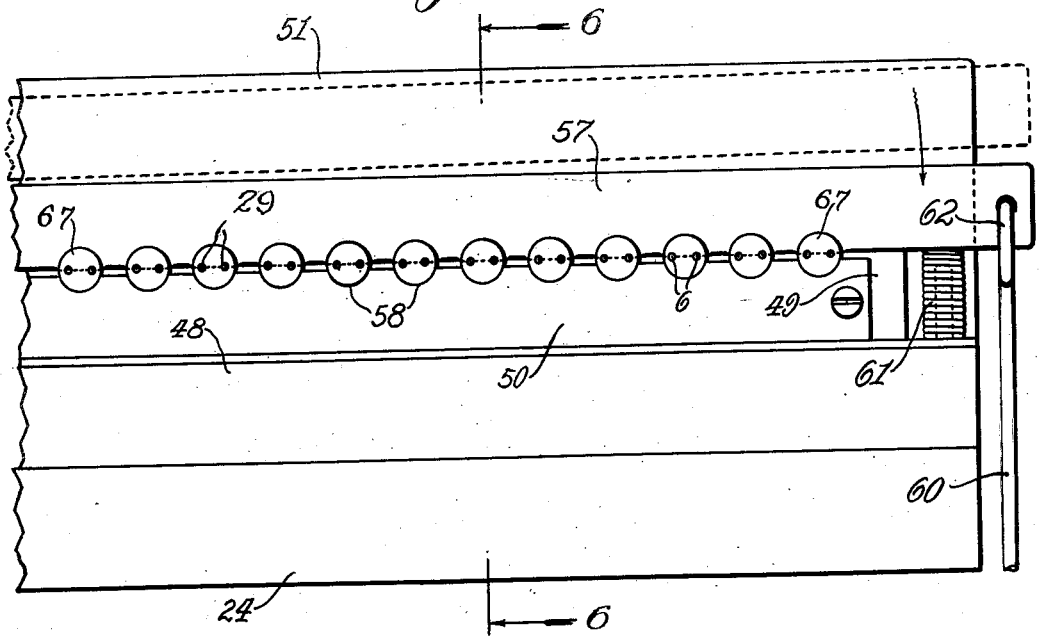
Figure 5 is a front view of a device illustrating another embodiment of this invention.

Referring to the accompanying drawing 1 designates a base which may be of any suitable pattern and constructed of any suitable material such as cast iron or steel. The base 1 is provided with a head 2 in which slots or grooves 3 are formed to receive a series of cutters 4 and 5. These cutters are mounted for adjustment in the slots 3, the adjustment being made by means of adjusting screws 6. After adustment the cutters may be clamped by means of a bolt 7 to secure them in adusted position.

Mounted for sliding movement on the base 1 is a block 8 having beveled sides 9 adapted for cooperation with a pair of correspondingly beveled guides 10. The guides 10 may be secured to the base by screws 11 and serve to guide the block 8 in its movement along the base. The block 8 is further provided with slots in a manner similar to the head 2 and in which a similar set of cutters 4 and 5 are mounted. The cutters of this second set may be adusted in any suitable manner, as by means of wedges 13, and clamped in adjusted position by a clamping bolt 14. The block 8 is placed upon the base in such a position as to provide a passage or channel 15 between the heads 2 and 12, the ends of the cutters 4 and 5 projecting into this passage.

Mounted on the rear end of the block 8 is a plate 16 projecting laterally beyond said block and carrying an adjusting screw 17 adapted to bear against one of the guides 10 to limit the movement of the block 8. The plate 16 also projects beyond the base 1 and is provided at its end with a lug 18 adapted to receive one end of a spring 19 which at its other end takes over a similar lug 20 on a bracket 21 on the guide 10. The spring 19 serves to retain the block 8 in retracted position in which the cutters 4 and 5 are separated. Pivoted on the side of the base 1 at 22 is a lever having an arm 23 arranged to bear against the projecting end of the plate 16 and an arm 24 attached by a link 25 to a suitable treadle not shown. By operation of this treadle the operator may rock the lever 23, 24 so as to move the block 8 in its guides to bring the cutters together for severing the connections.

Mounted adjacent the cutting mechanism just described a reeling device 26 of any suitable type may be provided upon which the lead wires may be reeled. In the device illustrated a tube 27 of paper or other suitable material is arranged to be slipped onto the reeling shank. The strand is slipped into a slot 28 in the shank and the tube and is then wound upon the tube to any desired length before cutting.

In the use of this device the strands 29 of connection wire are paid off of a suitable reel or reels not shown and are laid into the passage 15 during or after the completion of the operation of reeling the same on the tube 27. When the desired length of wire has been paid out the cutting device is operated to sever the connection. By operating the foot treadle the lever 23, 24 is rocked and the block 8 is moved to the right, Figure 1. The cutters 4 are severing cutters which are adjusted so that their cutting edges will pass each other in order to completely sever the connections. The cutters 5 are stripping cutters and are adjusted so that when the screw 17 comes against the guide 10 to stop the movement of the block 8, their cutting ends will be separated just sufficiently to avoid cutting the wire but will be close enough together to cut the insulation thereon. One pair of cutters 5 is shown in Figure 1 above the severing cutters 4 and spaced therefrom a distance equal to the length of wire to be stripped. Below the severing cutters 4, in Figure 1, two sets of cutters 5 are shown, the terms above and below, as here used, referring to the showing of Fig. 1. These cut the insulation at two points so that the same may be stripped in sections in order to reduce the force required to strip off a long section of insulation. The end-most cutter 5 below the severing cutters is spaced a considerable distance from the severing cutters so that an extra length of wire will be stripped. That part of the wire stripped by the upper cutters 5 provides a portion to be connected to the detonator. That part stripped by the lower cutters 5 provides an extra length of bare wire for connection to the firing device. As soon as the severing operation has been completed the reeling device 26 may be operated to withdraw the strand so as to strip the upper ends. At the same time the lower part of the strand may be engaged with a pulling device comprising a disc 30 mounted on a shaft 31 driven by any suitable source of power, not shown, and provided with a series of projecting pins 32. The wire is laced in among these pins so that rotation of the plate 30 will operate to withdraw the strand from between the cutters. A guide plate 33 may be provided to maintain the pull of the strand in line with the cutters. When the cutting and stripping operation has been completed the tube 27 with the completed connections wound thereon may be slipped from the shank of the reeling device.

It will be seen, therefore, that this invention provides an effective method and apparatus for cutting and stripping such connections. After paying out the proper length of wire the same is severed and the insulation of the severed ends is cut. The strand is then withdrawn from the cutters so as to strip the insulation therefrom. Both ends are simultaneously stripped for different lengths thereof and the strands are withdrawn in opposite directions from the severing cutters. At one end the insulation is cut in one place and at the other in several places in order to facilitate stripping. The cutters may be adjusted both individually or collectively so that just the right setting may be obtained for properly cutting the insulation. It will be seen that by means of this arrangement the connecting leads may be rapidly and economically prepared for assembly with the remaining parts of the device.

Figure 6:
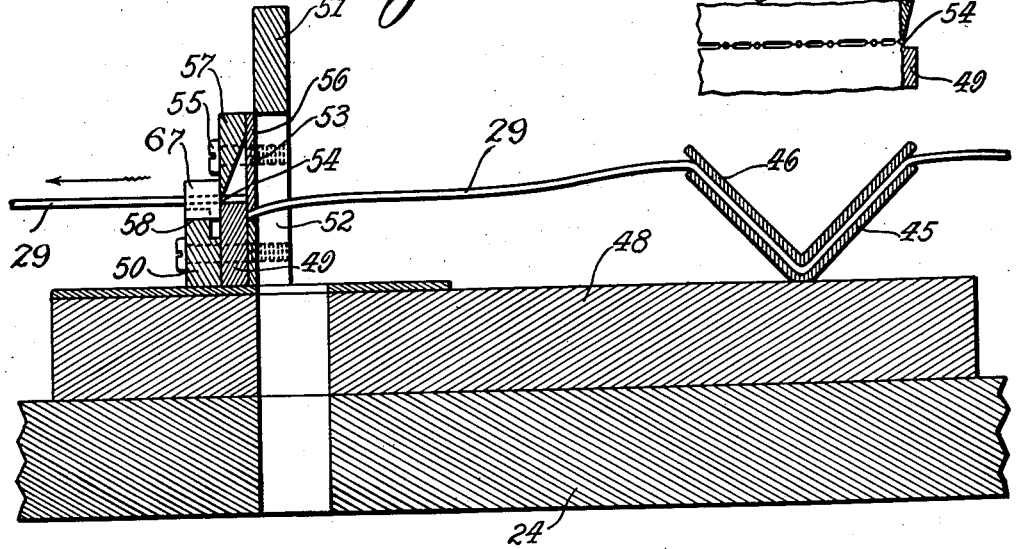
Figure 6 is a section on line 6—6 of Figure 5.
Figure 7:
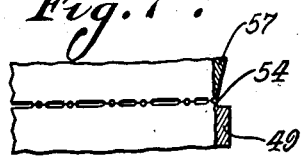
Figure 7 is a detail, somewhat enlarged, of Figure 6.

Figures 5 to 8 inclusive illustrate an embodiment of this invention in which the connections are stripped of their insulation after the plug has been cast thereon. The plug having been cast on the insulated wires, only the ends of the wires projecting from the plug are stripped. It will be noted that the composition plug 67 is cast upon a pair of insulated wires 29. It will also be noted that the mechanism is multiplex in that a series of plugs are cast upon a series of leads or wires. The mechanism hereinafter described is designed, however, not to only sever the wires adjacent a plug in order to separate a plug and its wires from a string of plugs and wires, but this severance is also at a predetermined distance from the end of the plug in order to provide terminals adapted to project predetermined distances into the shell. Moreover mechanism is provided for stripping the insulation from the terminals as shown at 59, Figure 8 in order to leave these terminals bare and for the attachment of the filament or igniter wire.

An apparatus for performing the operation will now be described. It will, however, be understood, that the apparatus is only illustrative of the method and that the method may be performed by simple manipulation apart from any specific mechanism.

Mounted on a table 24 is a base 48 which carries a stationary cutter 49, a gage 50 and a bracket 51 which has an opening at 52 to permit entrance of the wires. The cutter 49 has a cutting face 53 on the right Fig. 6 and a series of notched cutting edges 54 on the left. Pivoted at 55 on the bracket 51 are a pair of connected blades 56 and 57 arranged for cooperation with the cutting edges 53 and 54. The blade 57 is notched and sharpened to correspond to the sharpened notches 54 on the cutter 49. The gage 50 has a series of recesses 58 adapted to receive the plugs 67 on the connections 29, while these connections are received by the notches in the cutter 49, and the blade 57 and the left face of the cutter 49 provides a stop for these plugs.

The connected blades 56 and 57 are arranged to be moved down to cooperate with the cutter 49 by a treadle (not shown) connected by a link 60 with the free ends of the connected blades, while these blades are returned by a spring 61 on the cutter 49. The connection between the link and the connected blades is through the medium of a hook 62 so that these connected blades may be swung out of the way.

After the plugs 67 have been cast on the connections, these connections are strung through the opening 52 so as to position the plugs 67 in the notches 58 on the gage 50 and with the plugs against the cutter 49. The connections and the plugs thereon are at this time held between a clamping element 45 fixed on the base 48 and a cooperating movable element 46. This will position the connections in the notches 54 of the cutter 49 and with the right face of the plug Fig. 6 a predetermined distance from the cutting edge 53. By now moving the connected cutter blades 56 and 57 towards the cutter 49, the blade 56 will operate to sever the connections a predetermined distance from the plugs. The cooperating edges of the cutter 49 and the blade 57 will, however, simply cut through the insulation of the connections without cutting into the metallic conductors enclosed by the insulation. While the blade 57 is still held in depressed position the connections 29 are moved to the left, thereby stripping the insulation from the connections projecting beyond the plug, as shown in Figure 8.

It will, therefore, be seen that the invention accomplishes its objects. Means is provided for not only severing the wires or leads, but the trimming is accomplished in such a manner as to leave terminals projecting a predetermined distance from the end of the plug. Moreover coordinated with the trimming mechanism is a stripping mechanism which strips the insulation from the projecting terminals in order to permit attachment thereto of the igniter wire or filament. The operations are performed in a simple and effective manner and by mechanism which is simple in construction and effective in its action.

It is obvious that various changes may be made in details without departing from the spirit of this invention; it is, therefore, to be understood, that this invention is not to be limited to the specific details shown and described.

Having thus described the invention what is claimed is:

1. In the art of making detonators, the method comprising, a paying out a length of insulated wire for igniter connections, severing the wire, and simultaneously stripping the insulation from both the severed ends.

2. In the art of making detonators, the method comprising, simultaneously paying out a length of a plurality of insulated wires for igniter connections, severing the wire, and simultaneously stripping the insulation from both the severed ends.

3. In the art of making detonators, the method comprising, paying out a length of insulated wire for igniter connections, severing the wire, and simultaneously stripping different lengths of insulation from the severed ends.

4. In the art of making detonators, the method comprising, paying out a length of insulated wire for igniter connections, simultaneously severing the wire and cutting the insulation on each side of the point of severance, and withdrawing the severed ends to strip the insulation therefrom.

5. In the art of making detonators, the method comprising, paying out a length of insulated wire for igniter connections, simultaneously severing the wire and cutting the insulation at various points on opposite sides of the point of severance, and withdrawing the severed ends to strip the insulation therefrom.

6. In an apparatus of the character described, a base, means to simultaneously sever an igniter connection and to cut the insulation from the severed end comprising severing cutters and stripping cutters adjacently mounted on said base.

7. In an apparatus of the character described, a base, means to simultaneously sever an igniter connection and cut the insulation from the severed end, comprising severing cutters mounted on said base and a plurality of stripping cutters adjacent said severing cutters and on the same side thereof.

8. In a machine of the character described, a base, severing cutters thereon adapted for severing igniter connections, stripping cutters on opposite sides of said severing cutters, and means for operating said cutters.

9. In a machine of the character described, a base, severing cutters thereon adapted for severing igniter connections, stripping cutters on opposite sides of said severing cutters, there being a plurality of stripping cutters on one side of said severing cutters, and means for operating said cutters.

10. In a machine of the character described, a base, severing cutters thereon adapted for severing igniter connections, stripping cutters on opposite sides of said severing cutters, and means for operating said cutters, so as to simultaneously sever the connections and cut the insulation adjacent the severed end.

11. In a machine of the character described, a base having a passage therethrough for igniter connections, severing cutters and stripping cutters adapted for operation on igniter connections in said passage, and means for simultaneously operating said cutters.

12. In a machine of the character described, a base having a passage therethrough for igniter connections, severing cutters in said passage, stripping cutters in said passage on opposite sides of said severing cutters, and means for operating said cutters.

13. In a machine of the character described, a base having a passage therethrough for igniter connections, severing cutters and stripping cutters adapted for operation on igniter connections in said passage, means for simultaneously operating said cutters, and means for withdrawing the severed connections.

14. In a machine of the character described, a base having a passage therethrough for igniter connections, severing cutters and stripping cutters adapted for operation on igniter connections in said passage, means for simultaneously operating said cutters, and means for withdrawing the severed connections in opposite directions.

15. In a machine of the character described, a base, severing cutters thereon adapted for severing igniter connections, stripping cutters on opposite sides of said severing cutters, means for operating said cutters, and means for withdrawing the severed connections.

16. In a machine of the character described, a base, severing cutters thereon adapted for severing igniter connections, stripping cutters on opposite sides of said severing cutters, means for operating said cutters, and means for withdrawing the severed connections in opposite directions.

17. In a machine of the character described, a base having a passage therethrough for igniter connections, severing cutters in said passage adapted to sever igniter connections, stripping cutters adapted to transversely cut the insulation of the igniter connections, means for operating said cutters, and means for adjusting said cutters.

18. In a machine of the character described, a base having a passage therethrough for igniter connections, severing cutters in said passage adapted to sever igniter connections, stripping cutters adapted to transversely cut the insulation of the igniter connections, means for operating said cutters, and means for adjusting said cutters individually and collectively.

In testimony whereof we affix our signatures this 25th day of August, 1925.

JOHN M. OLIN.
JOHN B. SMITH.